US006964445B1

(12) United States Patent
Bellis, Jr.

(10) Patent No.: US 6,964,445 B1
(45) Date of Patent: Nov. 15, 2005

(54) TAIL GATE ASSIST

(76) Inventor: William B. Bellis, Jr., 1401 Schuff La., Louisville, KY (US) 40205

( * ) Notice: Subject to any disclaimer, the term of this patent is extended or adjusted under 35 U.S.C. 154(b) by 0 days.

(21) Appl. No.: 11/135,108

(22) Filed: May 23, 2005

(51) Int. Cl.[7] .................................... B62D 33/08
(52) U.S. Cl. ........................ 296/57.1; 296/61; 414/537
(58) Field of Search ........................... 296/57.1, 50, 61; 414/537

(56) References Cited

U.S. PATENT DOCUMENTS 2,328,082 A 8/1943 Lawrence
2,563,845 A 8/1951 Benjamin
4,887,393 A 12/1989 Cysewski
5,954,383 A 9/1999 Beck et al.
6,126,223 A 10/2000 Rayburn
6,196,609 B1 3/2001 Bowers
6,485,004 B1 11/2002 Licata et al.

*Primary Examiner*—Joseph D. Pape
(74) *Attorney, Agent, or Firm*—Camoriano & Associates; Theresa Fritz Camoriano; Guillermo Camoriano

(57) ABSTRACT

A tail gate assist is provided for an open trailer and includes an elastic member mounted so as to provide assistance in raising the tail gate without substantially adding to the force required to open the tail gate.

15 Claims, 5 Drawing Sheets

TAIL GATE ASSIST

BACKGROUND

Open trailers with tail gates are often used to transport lawn care equipment and other products. As the tail gate may be long and heavy, it can be difficult to operate by hand. In a typical arrangement, with a tail gate that is five feet long from the hinge to the free end, a force of 80 pounds must be applied at the free end of the tail gate in order to lift the tail gate when it is in the open position. Several types of lift devices have been used in the past, but they all have problems. In many cases, the lift device includes a spring or other elastic member which substantially increases the resistance against which a person must work in order to open the tail gate from its closed position, making it much more difficult to open the tail gate than if there were no assist at all. So, while the elastic member does provide an advantage in that it helps with lifting the tail gate, it also creates a substantial disadvantage by making the tail gate more difficult to open than it would be without the assist.

For example, U.S. Pat. No. 6,485,004 "Licata" shows a lift spring for a tail gate in which the lift spring is mounted to the side rail of the trailer and to the tail gate. The spring extends upwardly from the side rail to the tail gate when the tail gate is closed and downwardly from the side rail to the tail gate when the tail gate is fully open. The spring is in tension throughout the entire distance of travel of the tail gate and its length does not increase substantially from the raised position to the lowered position, so the spring force does not change appreciably from the closed position to the open position. In this case, since the spring force is roughly the same throughout the travel of the tail gate and since the angles at which the spring applies its force are not advantageous, the operator must exert a substantial force against the spring in order to open the tail gate, and very little of the spring force actually helps counteract the weight of the tail gate in order to help the operator raise the tail gate. At the beginning of travel from the closed position, the spring is pulling primarily downwardly on the tail gate, but it also exerts a horizontal force against which the operator must pull in order to open the tail gate. As the operator begins to open the tail gate and throughout the rest of the travel of the tail gate, the spring force acts primarily in the horizontal direction, so the operator has to pull the tail gate outwardly against that spring force in order to open the tail gate. Even in the fully open position, the spring angle is such that most of the spring force is acting in the horizontal direction and very little of the spring force is acting in an upward direction to help counteract the weight of the tail gate.

U.S. Pat. No. 6,126,223 "Rayburn" mounts an elongated assist system along the top of the side rail of the trailer. This occupies a substantial distance along the side rail, which is undesirable, because it prevents that space from being used for other purposes. In this design, the elastic member includes a spring and a cable mounted onto the spring. The cable passes over rollers and the elastic member does not remain in a straight line but rather bends around the rollers. Again, the elastic member does not elongate appreciably from the fully closed position to the fully open position, so it is exerting a substantial spring force against the tail gate in all positions. In order to begin opening the tail gate, the operator must apply a substantial horizontal force to counteract the horizontal force of the spring, and most of the spring force continues to be applied in a horizontal direction, even at the fully opened position of the tail gate, so only a small portion of the spring force actually helps act against gravity to help lift the tail gate.

SUMMARY

The present invention provides a tail gate assist for an open trailer in which an elastic member is oriented to provide help in acting against gravity to help the operator raise the tail gate with very little effort while, at the same time, not creating a substantial force against which the operator has to act in order to open the tail gate.

DESCRIPTION OF THE PREFERRED EMBODIMENTS

Figure 1:
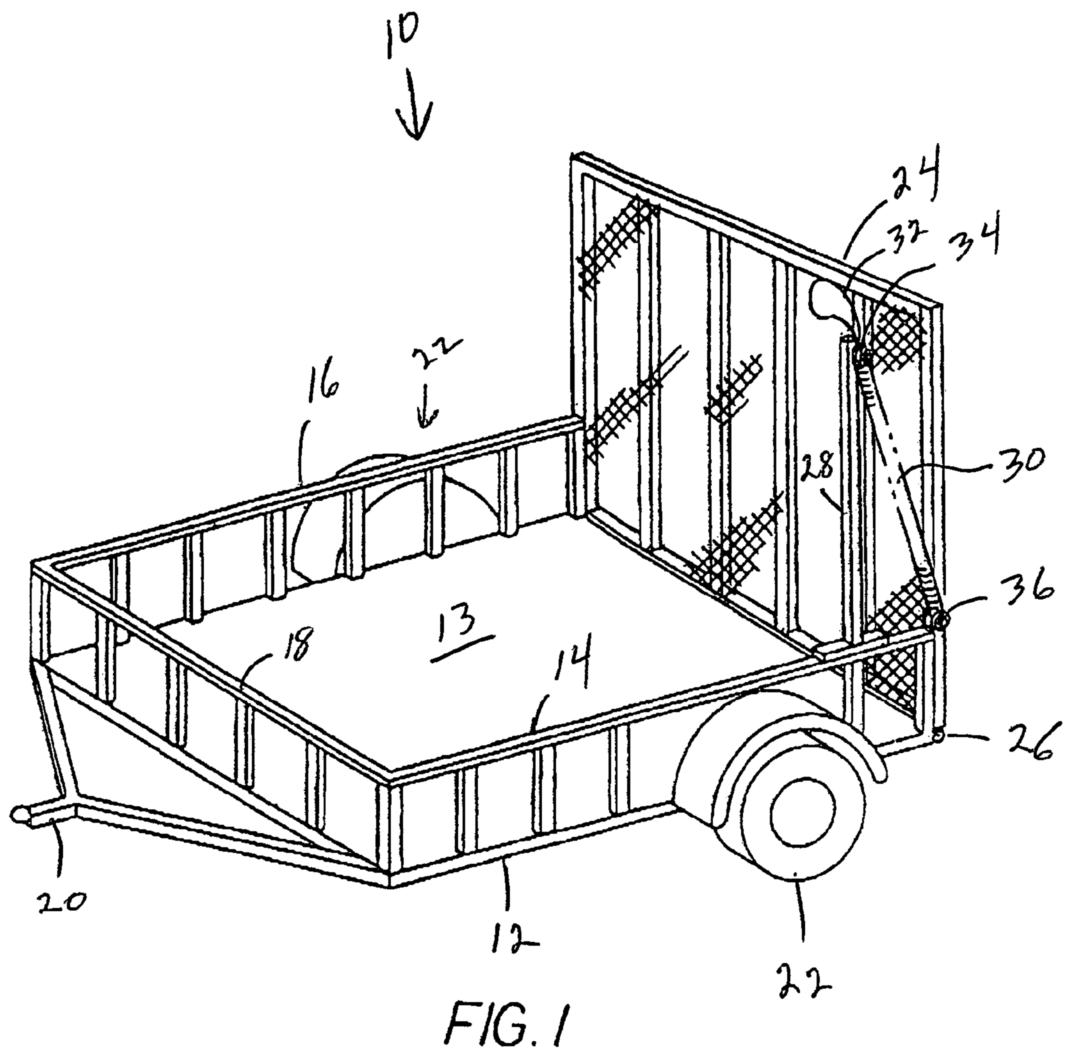
FIG. 1 is a perspective view of a trailer including a tail gate assist arrangement made in accordance with the present invention.

FIG. 1 is a perspective view of a trailer 10 including a tail gate assist arrangement made in accordance with the present invention. The trailer 10 includes a frame 12, and a floor 13, with left and right parallel side rails 14, 16 extending at an elevation above the floor 13. In this case, the side rails 14, 16 are parallel to the floor 13. However, other arrangements are known in which the side rails lie at an angle to the floor. Typically, the floor 13 or bed of the trailer 10 is about sixteen to twenty inches above the ground, and the side rails 14, 16 are about one foot above the bed 13 of the trailer or twenty-eight to thirty-two inches above the ground. This trailer 10 also has a front rail 18 and a tongue 20. This trailer 10 also has two wheels 22, which support the frame 12, floor 13, and rails 14, 16, 18.

A tail gate 24 is pivotably mounted to the frame 12 by means of a hinge 26, having a horizontal pivot axis. Typically, the tail gate 24 is about forty-two to sixty inches long from its first end, which is mounted to the hinge 26, to its free end. The tail gate 24 is shown in the closed position in FIG. 1. An upright post 28 is mounted onto the top of the left side rail 14 near the rear of the trailer 10. This particular post 28 is three feet long, but it could be longer or shorter, depending upon the trailer. In this case, since the post 28 is mounted on top of the side rail 14, it projects upwardly above the hinge 26 a distance of four feet, putting it a bit lower than the top of the tail gate 24, or roughly at the same elevation as the tail gate when the tail gate is in the closed position. It is preferred that the top of the upright post 28 be a distance above the hinge 26 that is at least half the length of the tail gate 24.

A helical coil spring 30 is secured at one end 34 of the post 28 near the top of the post 28 and at the other end to the side of the tail gate 24. A retaining cable 32 extends through the longitudinal opening in the spring 30 and is also secured to the post 28 and to the side of the tail gate 24. The retaining cable 32 is substantially non-elastic and is intended to retain the spring 30 in the event that the spring 30 breaks.

Figure 3:
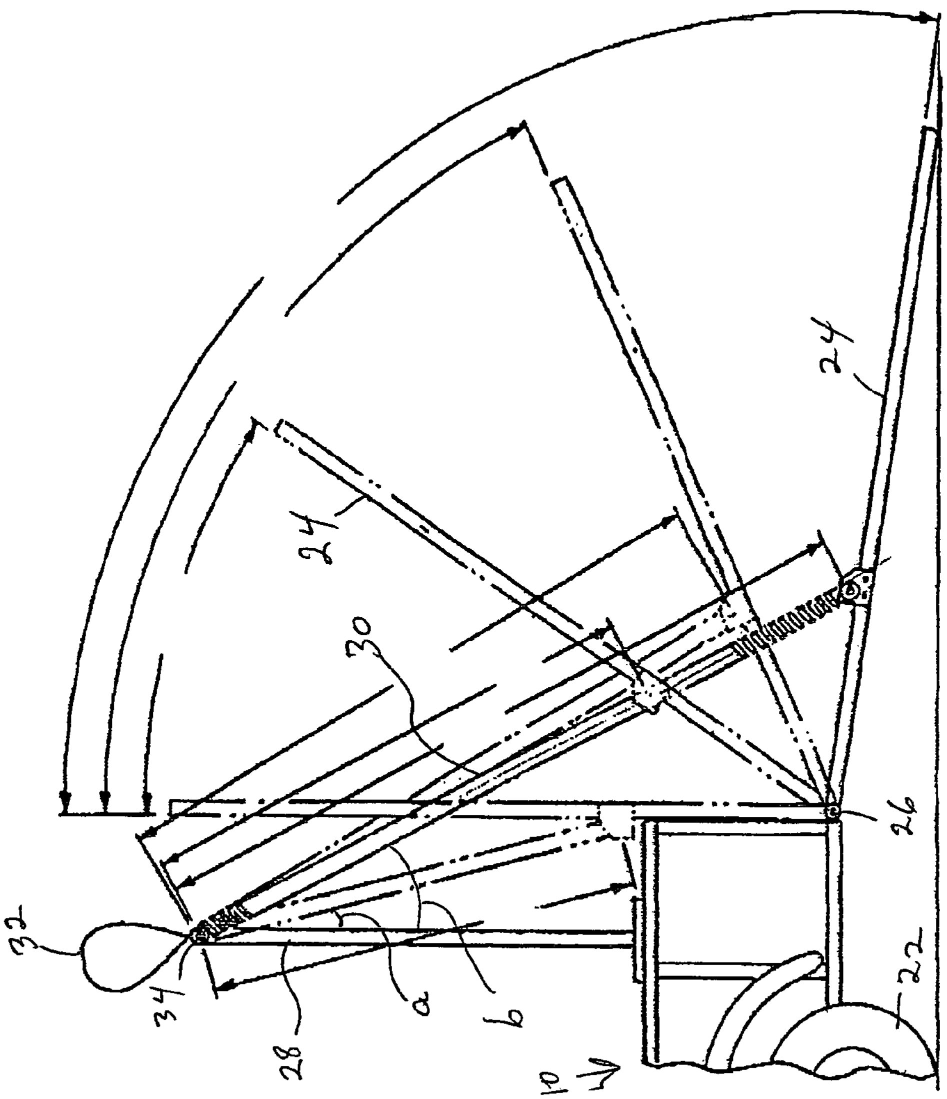
FIG. 3 is the same view as FIG. 2 but showing the tail gate and the assist arrangement in various positions as the tail gate is moved from the fully closed position to the fully open position.
Figure 2:
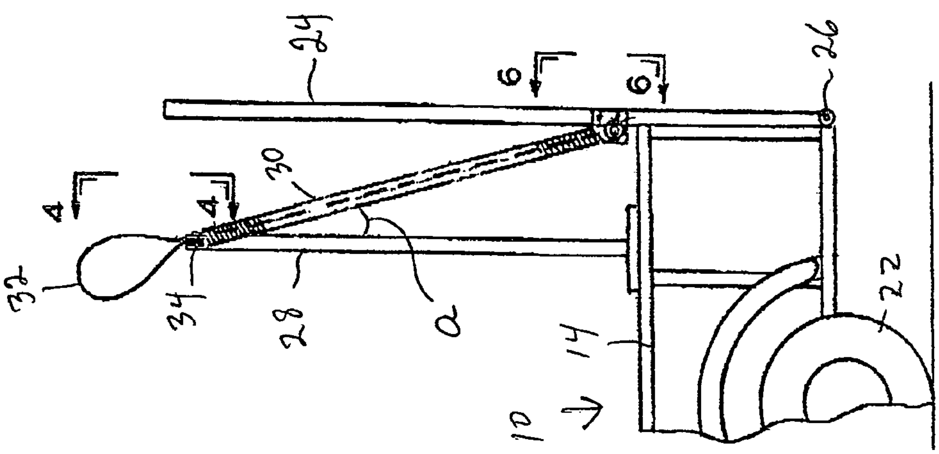
FIG. 2 is a side view of the rear portion of the trailer of FIG. 1.

FIGS. 2 and 3 show that the spring 30 (the elastic member) extends in a straight line and at a downward angle from the post 28 to the tail gate 24 at all positions of the tail gate 24, from the substantially vertical closed position shown in FIG. 2 (and shown in phantom in FIG. 3) to the substantially horizontal open position shown in FIG. 3. The downward angle "a" between the spring 30 and the upright post 28 when the tail gate 24 is closed is an acute angle, and the downward angle "b" between the spring 30 and the upright post 28 when the tail gate is open is also an acute angle. It is preferred that the angles "a" and "b" be less than 60 degrees and more preferred that they be less than 45 degrees so that the vertical component of the spring force is substantial and preferably greater than the horizontal component. FIG. 3 shows that the spring 30 elongates substantially from the closed position to the open position, so the spring force increases substantially from the closed position to the open position, with the spring 30 applying very little force on the tail gate when the tail gate is closed, and with the spring force increasing as the tail gate opens, until the maximum spring force is applied when the tail gate is in the open position. In this embodiment, the spring is 30 inches long in the retracted position and 50 inches long in the open position. It is preferred that the length of the spring increase at least 20% from the closed position to the open position.

In this embodiment, the horizontal force required to begin opening the tail gate 24 when it is in the closed position is very little—approximately two pounds. This is about the same as the force that would be required to begin opening the tail gate 24 if the spring 30 were not present. It is preferred that the spring 30 not increase the force needed to open the tail gate by more than five pounds over what would be required without the spring.

In this embodiment, if the spring were not present, the user would have to apply about 80 pounds of upward force at the free end of the tail gate 24 in order to begin closing the tail gate 24 when it is in the open position. With the spring present, the force that is required at the free end of the tail gate 24 in order to begin lifting it is less than fifteen pounds, reducing the required force by more than 80%. It is preferred that the external lifting force that needs to be applied by the user in order to begin closing the tail gate 24 be reduced by 75% or more.

Figure 5:
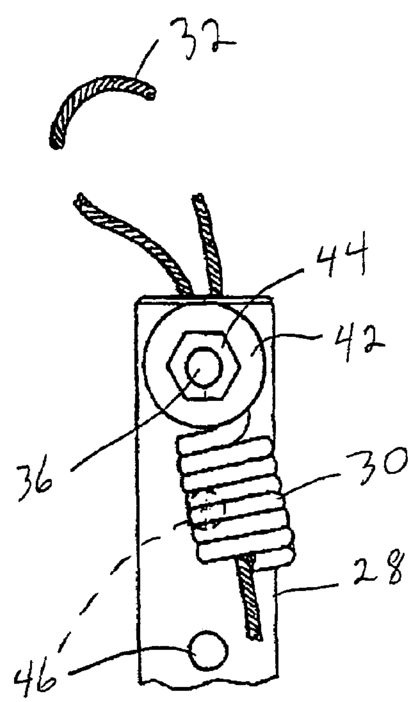
FIG. 5 is a side view of the upper portion of the upright post of FIG. 4.
Figure 4:
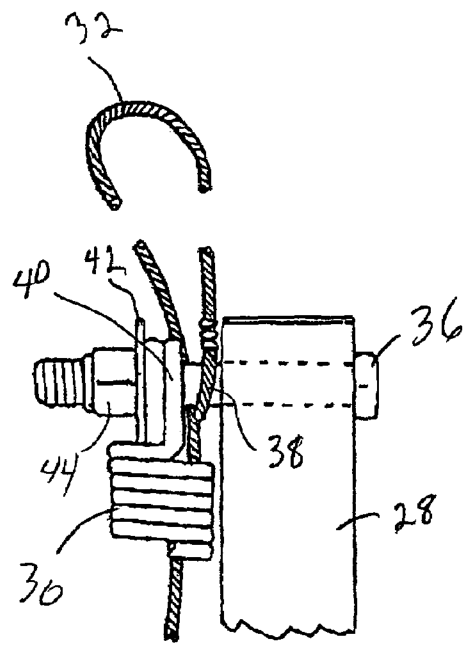
FIG. 4 is a view taken along the line 4—4 of FIG. 2, showing the upper portion of the upright post.

FIG. 4 shows the top portion of the upright post 28 with a bolt 36 extending through a hole in the upright 28, through a loop 38 in the cable 32 through a loop 40 on the end of the spring 30, through a washer 42 and through a nut 44 to secure the spring 30 and cable 32 to the upright 28. FIG. 5 is a side view of the same arrangement. In this view it can be seen that there are multiple holes 46 through the upright 28, which effectively allows adjustment of the height of the upright 28.

Figure 6:
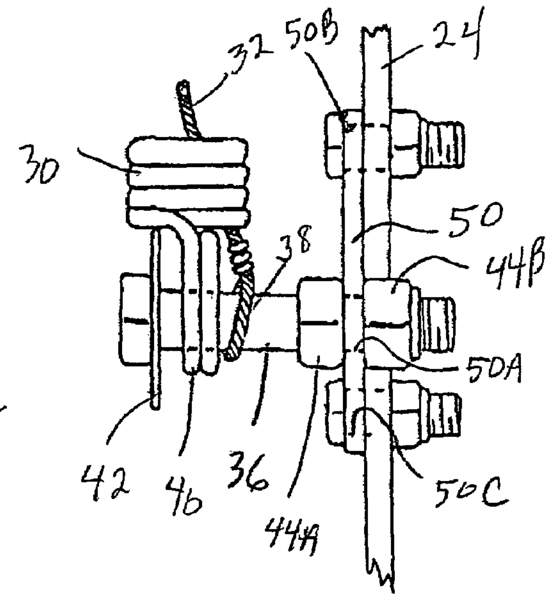
FIG. 6 is a view taken along the line 6—6 of FIG. 2, showing the bracket and connection between the elastic member and the tail gate.

FIG. 6 shows the bottom end of the spring 30 and cable 32, showing how they are secured to the tailgate 24. A bolt 36 extends through a washer 42, through a loop 40 in the bottom of the spring 30, through a loop 38 in the bottom of the cable 32, through a nut 44A, through a hole 50A in a bracket 50 secured to the tail gate 24, and through another nut 44B in order to secure the cable and spring to the tail gate 24. The bracket 50 is a flat piece, having parallel flat faces, with one of the flat faces lying against the tail gate 24. The bracket 50 has three holes 50A, 50B, 50C, one of which receives the bolt 36 that secures the spring 30 and cable 32, and the other two of which receive bolts that secure the bracket 50 to the side of the tail gate 24. The three bolt holes 50A–C form a triangle, and the hole 50A is closer to the hole 50C than to the hole 50B. This permits the bracket to be used to adjust the point at which the spring 30 and cable 32 are secured without changing the positions of the holes through the tail gate 24 through which the bracket 50 is secured to the tail gate 24.

Figure 7:
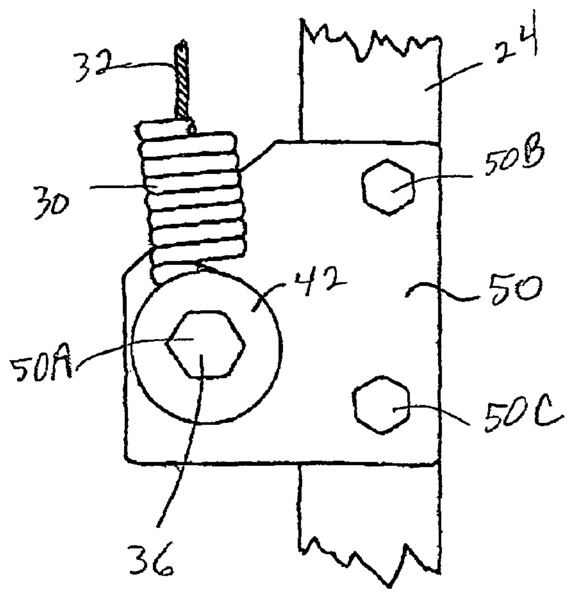
FIG. 7 is a side view of the bracket and connection of FIG. 6.
Figure 11:
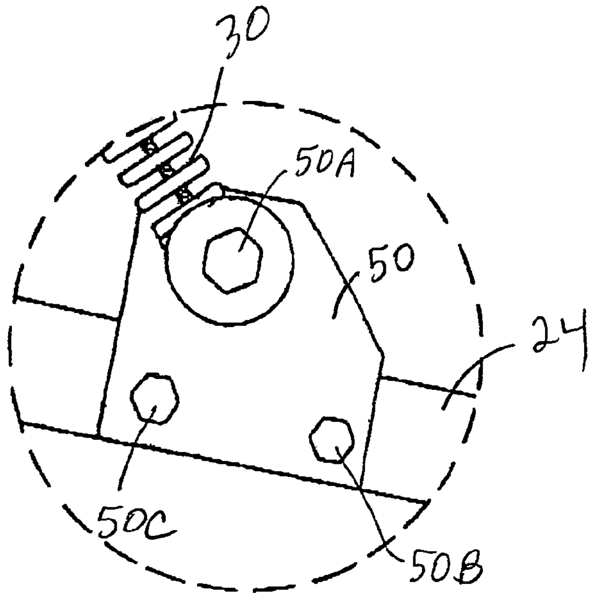
FIG. 11 is an enlarged side view of the mounting bracket and tail gate portion of FIG. 7 but with the tail gate in the open position.
Figure 12:
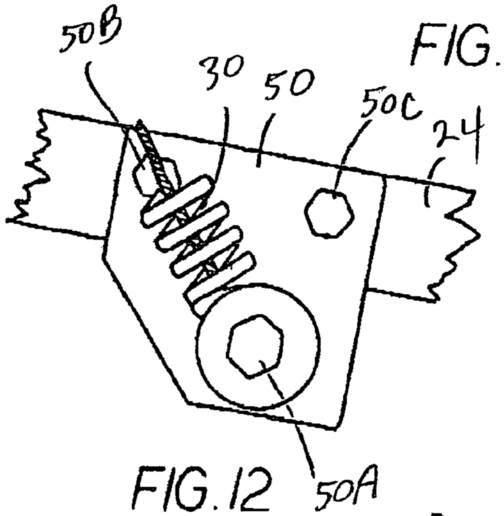
FIG. 12 is the same view as FIG. 11 but with the mounting bracket mounted in a first alternative way on the tail gate.
Figure 13:
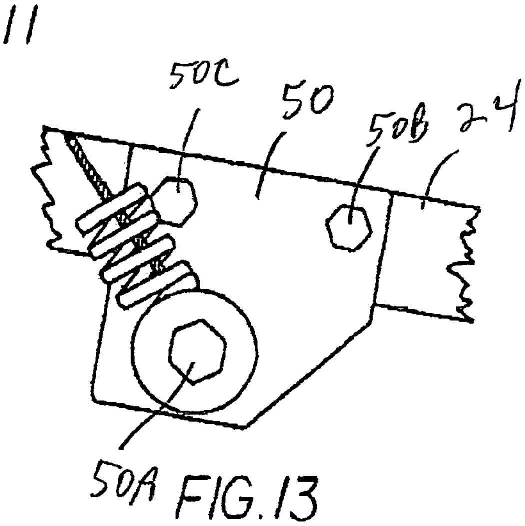
FIG. 13 is the same view as FIG. 11 but with the mounting bracket mounted in a second alternative way on the tail gate.
Figure 14:
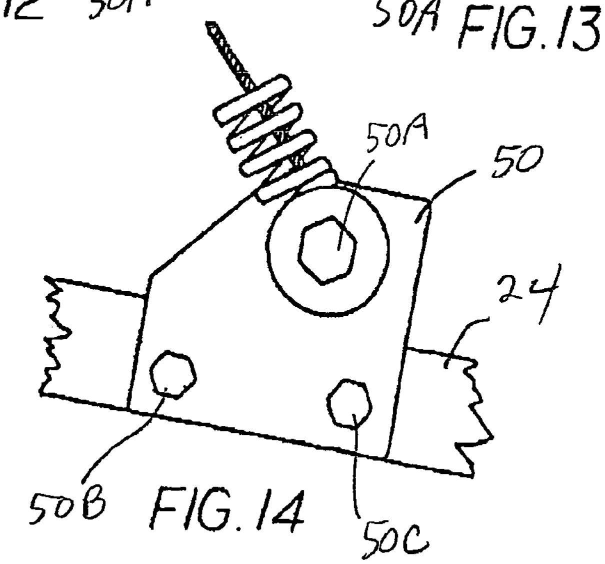
FIG. 14 is the same view as FIG. 11, but with the mounting bracket mounted in a third alternative way on the tail gate.

FIGS. 11–14 show the spring 30 mounted in four different positions using the same bracket 50 mounted through the same two holes in the tail gate 24. FIG. 11 has the bracket 50 mounted as shown in FIG. 7, with the first flat face of the bracket against the side of the tail gate 24 and the hole 50A projecting above the tail gate 24. In FIG. 12, the first flat face of the bracket 50 is still against the side of the tail gate 24, but the bracket 50 has been rotated 180 degrees, so the hole 50A now projects below the tail gate 24. The arrangement of FIG. 13 is produced by taking the bracket as shown in FIG. 12 and flipping it over, so the second flat face of the bracket lies against the side of the tail gate 24. In this position, the hole 50A projects downwardly as in FIG. 12, but it is shifted toward the hinge 26. To go from the arrangement of FIG. 13 to the arrangement of FIG. 14 requires rotating the bracket 50 180 degrees, so the hole 50A projects above the tail gate 24. This is similar to the arrangement of FIG. 11, except the hole 50A is farther away from the hinge 26.

Figure 9:
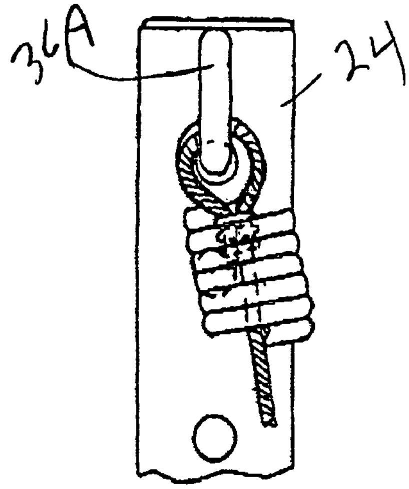
FIG. 9 is a side view of the arrangement of FIG. 8.
Figure 8:
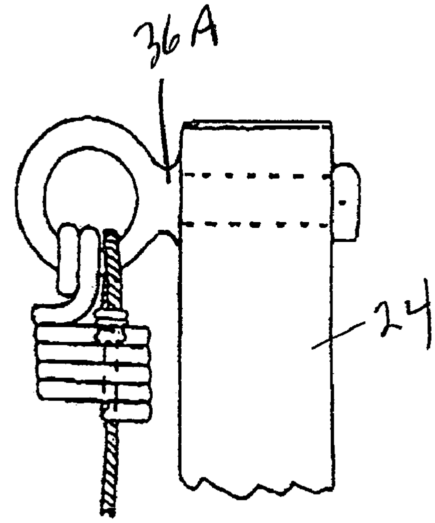
FIG. 8 is a view similar to FIG. 4 but showing an alternative connection between the elastic member and the upright post.
Figure 10:
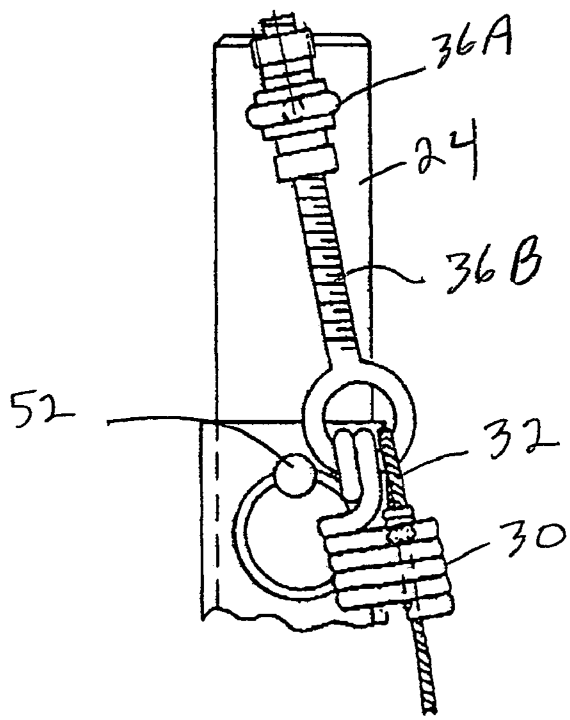
FIG. 10 is a side view of an alternative connection between the elastic member and the upright post and an alternative upright post, in which the post is made of telescoping members.

FIGS. 8–10 show different mounting arrangements for mounting the spring 30 and cable 32 to the upright post 28. In FIGS. 8 and 9, an eye bolt 36A is used instead of the straight bolt of FIG. 4. In FIG. 10, a second eye bolt 36B is mounted through the first eye bolt 36A. The spring 30 and cable 32 are secured to the second eye bolt 36A, and the second eye bolt 36B can be rotated relative to its nut to effectively lengthen or shorten the cable 32 and spring 30. Also, as shown in FIG. 10, the upright post 24 is a telescoping member, which can be lengthened or shortened depending upon which pair of holes is aligned and receives the pin 52.

A preferred method for mounting the tail gate assist arrangement of this embodiment to the trailer 10 is accomplished with the following procedure.

1. Hold the upright post 28 in a desired position on the left or right trailer side rails 14, 16 near the rear of the trailer 10 (usually about a foot from the rear).

2. With the tailgate 24 closed, mark the desired location for the gate bracket 50 on the same side (left or right) of the tailgate by measuring 30 inches (the retracted length of the spring in this embodiment) from the hole 46 to the tailgate. For most tailgates, this will be approximately 14 inches from the hinge 26.

3. Open the tailgate and measure the distance from the hole 46 in the top of the upright 24 to the location marked in Step 2. The distance should not be more than 53 inches, which, in this embodiment, is the maximum length of the spring. If it is more than 53 inches, then the position of the upright post 28 should be adjusted and Steps 1–3 repeated. Once the proper locations for the upright 28 and bracket 50 are determined, proceed to Step 4.

4. Attach the upright post 28 to the left or right trailer side rails 14, 16 by drilling four holes through the side rail and attaching it with four ⅜ inch grade "5" bolts and lock nuts.

5. Attach the gate bracket 50 to the tailgate 24 at the marked location by using the two small holes 50B, 50C in the bracket and two ½ inch by 1½ inch grade "5" bolts and lock nuts (Note: holes will have to be drilled through the tailgate).

6. Insert one end of the cable 32 inside the spring 30 and feed it through the spring until it exits the other end of the spring.

7. Attach one end of the spring and cable to the upright post 24 with a % inch by 4½ inch grade "5" bolt using the following configuration. (Shown in FIGS. 4 & 5)

a. Slide the bolt 36 through the hole 46 at the top of the upright post 24 such that the head of the bolt is on the inside (toward the trailer) and the threads are on the outside (away from the trailer).
   b. Slide the end loop of the cable 32 over the bolt.
   c. Slide the end loop of the spring 30 over the bolt.
   d. Slide a ⅝ inch washer 42 over the bolt.
   e. Thread a lock nut 44 onto the bolt until a minimum of three threads are showing on the bolt.

8. Make sure the tailgate is in the closed position and attach the other end of the spring and cable to the gate bracket with a ⅝ inch by 4½ inch grade "5" bolt using the following configuration. (Shown in FIGS. 6 & 7)

a. Slide a ⅝ inch washer 42 over the bolt 36.
   b. Slide the end loop of the spring 30 over the bolt.
   c. Slide the end loop of the cable 32 over the bolt.
   d. Securely tighten a ⅝ inch standard nut 44A against the shoulder of the bolt.
   e. Insert the bolt 36 through the remaining large hole 50A in the gate bracket 50 such that the head of the bolt is on the outside (away from the trailer) and the threads are on the inside (toward the trailer).
   f. Thread a lock nut 44B onto the bolt until it tightens against the bracket 50.

9. The tail gate assist arrangement is now ready for use.

To change the leverage (or lift) of the tailgate, the bracket 50 can be repositioned using the same two holes 50B, 50C in the tailgate (See FIGS. 11–14). To reposition the bracket, first make sure the tailgate is in the closed position. Then, unscrew the two lock nuts and remove the bracket. Depending on the desired position, it may also be necessary to remove the bolt 36 from the bracket by removing the third lock nut 44B. For instance, changing from the position shown in FIG. 11 or 12 to the position shown in FIG. 13 or 14 would require removal of the bolt 36 to "flip" the bracket 50, but changing from the position shown in FIG. 11 to the position shown in FIG. 12 would not require removal of the bolt. Once the desired position is chosen by rotating and/or flipping the bracket, the bracket is simply reattached to the same holes 50B, 50C with the bolts and lock nuts.

The leverage or tension also may be adjusted by changing the mounting position on the upright post 28 or by telescoping the upright post, or by adjusting the length of the turnbuckle 36B, or other similar means.

It will be obvious to those skilled in the art that modifications may be made to the embodiments described above without departing from the scope of the present invention.

What is claimed is:

1. An arrangement for assisting with opening and closing the tail gate of an open trailer, comprising:

an open trailer, including a frame defining a front, rear, left, right, top and bottom;

a hinge mounted on said frame, said hinge having a horizontal axis of rotation;

a tail gate having first and second ends, said first end being mounted to said hinge so that said tail gate pivots relative to said trailer about said horizontal axis of rotation from a substantially vertical closed position to a substantially horizontal open position;

an upright post mounted near the rear of said frame and projecting upwardly above the elevation of said hinge; and an elastic member having first and second ends, said first end being secured to said upright post and said second end being secured to said tail gate, wherein said elastic member defines a straight line and extends downwardly from said first end to said second end at all the positions of said tail gate, from said closed position to said open position, so that said elastic member elongates continuously as said tail gate moves from its closed position to its open position.

2. An arrangement for assisting with opening and closing the tail gate of an open trailer as recited in claim 1, wherein a downward acute angle is formed between said elastic member and said post at all positions of said tail gate from the closed position to the open position.

3. An arrangement for assisting with opening and closing the tail gate of an open trailer as recited in claim 2, and wherein said elastic member lengthens continuously from said closed position to said open position, so that it is at least 20% longer in said open position than in said closed position and exerts substantially greater force on said tail gate when said tail gate is in said open position than when said tail gate is in said closed position.

4. An arrangement for assisting with opening and closing the tail gate of an open trailer as recited in claim 3, wherein said elastic member is a coil spring defining a central, elongated opening, and further comprising a retaining cable extending through said elongated opening and secured to said post and to said tail gate.

5. An arrangement for assisting with opening and closing the tail gate of an open trailer as recited in claim 4, wherein the downward angle between the elastic member and the post is less than sixty degrees at all positions of said tail gate.

6. An arrangement for assisting with opening and closing the tail gate of an open trailer as recited in claim 4, wherein the downward angle between the elastic member and the post is less than forty-five degrees at all positions of said tail gate.

7. An arrangement for assisting with opening and closing the tail gate of an open trailer as recited in claim 2, wherein said tail gate has left and right side members, and further comprising a bracket mounted to one of said side members of said tail gate, said bracket being a flat member having two parallel flat faces, and having two aligned holes passing through those parallel flat faces and two bolts extending through those aligned holes and through corresponding holes in said one side member, said bracket further defining a third hole which is closer to one of said aligned holes than to the other of said aligned holes, said third hole and said two aligned holes defining a triangle, wherein said elastic member is secured to said bracket at said third hole, and wherein the mounting position of said elastic member on said tail gate can be adjusted to four different positions, depending upon which face of said bracket is placed adjacent to said one side member and which of said aligned holes is placed closer to the first end of the tailgate.

8. An arrangement for assisting with opening and closing the tail gate of an open trailer as recited in claim 2, wherein the length of said tail gate is the distance between its first and second ends, and said post extends upwardly above the frame a distance that is at least half the length of the tail gate.

9. An arrangement for assisting with opening and closing the tail gate of an open trailer, comprising:

an open trailer, including a frame defining a front, rear, left, right, top and bottom and wheels supporting said trailer frame;

a hinge mounted on said frame, said hinge having a horizontal axis of rotation;

a tail gate having first and second ends, said first end being mounted to said hinge so that said tail gate pivots relative to said trailer about said horizontal axis of rotation from a substantially vertical closed position to a substantially horizontal open position, with the length of said tail gate being the distance between said first and second ends;

an upright post mounted near the rear of said frame, wherein said post has a top end that projects above said hinge a distance that is at least half the length of said tail gate; and a coil spring having a first end mounted to said upright post near said top end and having a second end mounted to said tail gate, wherein said coil spring extends in a straight line from its first end to its second end and extends at a downwardly acute angle to said upright post at all positions of said tail gate from said open position to said closed position, said coil spring defining an elongated central opening; and a retaining cable extending through said elongated central opening and secured to said post and to said tail gate.

10. An arrangement for assisting with opening and closing the tail gate of an open trailer as recited in claim 9, wherein said retaining cable is secured to said post and to said tail gate at the same positions as said coil spring.

11. An arrangement for assisting with opening and closing the tail gate of an open trailer as recited in claim 9, and further comprising means for adjusting the effective height of said post.

12. An arrangement for assisting with opening and closing the tail gate of an open trailer as recited in claim 9, and further comprising means for adjusting the effective length of said coil spring.

13. An arrangement for assisting with opening and closing the tail gate of an open trailer as recited in claim 9, wherein said tail gate includes left and right side members, and further comprising a bracket mounted to one of said side members of said tail gate, said bracket being a flat member having two parallel flat faces, and having two aligned holes passing through those parallel flat faces and two bolts extending through those aligned holes and through corresponding holes in said one side member, said bracket further defining a third hole which is closer to one of said aligned holes than to the other of said aligned holes, said third hole and said two aligned holes defining a triangle, wherein said coil spring is secured to said bracket at said third hole, and wherein the mounting position of said elastic member on said tail gate can be adjusted to four different positions, depending upon which face of said bracket is placed adjacent to said one side member and which of said aligned holes is placed closer to the first end of the tailgate.

14. An arrangement for assisting with opening and closing the tail gate of an open trailer as recited in claim 9, wherein said arrangement reduces the force needed to lift the tail gate from its open position by at least 75%, and the force required to open the tail gate is not more than five pounds greater than the force required to open the tail gate without the spring.

15. An arrangement for assisting with opening and closing the tail gate of an open trailer as recited in claim 1, wherein said arrangement reduces the force needed to lift the tail gate from its open position by at least 75%, and the force required to open the tail gate is not more than five pounds greater than the force required to open the tail gate without the elastic member.

* * * * *

UNITED STATES PATENT AND TRADEMARK OFFICE
CERTIFICATE OF CORRECTION

PATENT NO. : 6,964,445 B1
DATED : November 15, 2005
INVENTOR(S) : William B. Bellis, Jr.

It is certified that error appears in the above-identified patent and that said Letters Patent is hereby corrected as shown below:

Column 5,
Line 27, delete "%" and insert -- 5/8 --.

Signed and Sealed this

Third Day of January, 2006

JON W. DUDAS
*Director of the United States Patent and Trademark Office*